United States Patent
Rothe et al.

[11] Patent Number: 5,979,970
[45] Date of Patent: Nov. 9, 1999

[54] ROOF ASSEMBLY FOR A CONVERTIBLE VEHICLE

[75] Inventors: Karl Rothe, Bramsche; Siegfried Licher, Georgsmarienhuette, both of Germany

[73] Assignee: Wilhelm Karmann GmbH, Osnabrueck, Germany

[21] Appl. No.: 08/976,394

[22] Filed: Nov. 21, 1997

[30] Foreign Application Priority Data

Nov. 23, 1996 [DE] Germany ............... 296 20 468 U

[51] Int. Cl.$^6$ .......................................... B60J 7/00
[52] U.S. Cl. .............................. 296/107.17; 296/107.18
[58] Field of Search .......................... 296/107.17, 107.18

[56] References Cited

U.S. PATENT DOCUMENTS 5,542,735 8/1996 Fürst et al. ............... 296/107.18
5,558,388 9/1996 Fürst et al. ............... 296/107.18

FOREIGN PATENT DOCUMENTS 3816060 11/1989 Germany.

Primary Examiner—Gary C. Hoge
Attorney, Agent, or Firm—Jordan and Hamburg LLP

[57] ABSTRACT

A roof assembly for a convertible vehicle includes a roof shell, which, in the closed position, is connected with a front windshield frame and runs essentially horizontally to a rear roof region and which can be shifted into an open position which opens the interior of the vehicle regionally. The roof shell is formed by two roof parts which are divided in the transverse direction of the vehicle and are connected over joint connections at the edge and which, by means of a driving unit engaging the rear roof part, can initially be swiveled up jointly during the opening process counter to the driving direction into an approximately vertical position and, after that, lowered into a packed position behind the rear seats.

27 Claims, 16 Drawing Sheets

ROOF ASSEMBLY FOR A CONVERTIBLE VEHICLE

BACKGROUND OF THE INVENTION

The invention relates to a roof assembly for a convertible vehicle in which the roof assembly includes a roof shell, which can be shifted into an open position.

In the case of a known convertible vehicle of this type (German patent 38 16 060 C2), a roof shell, which runs essentially horizontally in the roof contour, is provided between a front windshield frame and a rear roof region as a single component covering the interior of the vehicle in the closed position. The roof shell must be loosened by hand from the closed position and then laid down as an individual part, so that the opening process and the closing process for this roof construction overall are costly and not very user friendly.

SUMMARY OF THE INVENTION

It is an object of the invention to provide a roof assembly for a convertible vehicle of the above-named type, the roof shell construction of which, also suitable for the enlarged roof opening of a 4-seater vehicle, makes automatic shifting into the open or closed position possible with little technical effort and in a space-saving narrow space for movement and storage in such a manner, that an overall user friendly handling is achieved with high reliability.

In the region of a roof shell forming the essentially horizontal part of the roof contour, the convertible vehicle, constructed pursuant to the invention, has two roof parts, which are connected over respective joint connections at the edge into a structural unit in such a manner that, after an automatic opening process, the interior of the vehicle is opened, the convertible vehicle, even in a 4-seater version, can be driven with the roof open without a time-consuming manual manipulation of roof parts and the roof can afterwards be closed quickly essentially without affecting the passengers.

The two roof parts interact with two driving units, which engage them symmetrically to the longitudinal axis of the vehicle and the components of which, disposed in the lateral edge region of the car body below the rear roof region, can be shifted in a narrow movement space in such a manner, that the two roof parts can be lowered from their closed position, in which they jointly form the roof contour, into a space-saving, tight packed position behind the rear seat. At the same time, the two roof parts, in a first movement phase of the opening process, pass through swiveling curves, which extend counter to the driving direction and cause the roof parts, which have been swiveled up, to assume a position, in which the one part is behind the other. After that, the two roof parts are transferred over an essentially vertically proceeding lowering motion out of this first open position into the packed position.

For these opening and closing kinematics of the roof assembly, adequate head space is ensured for the passenger in the interior of the vehicle. The adjustable height of the convertible roof can be dimensioned with the 2-part roof shell construction in such a manner, that a safe and load-optimized movement of the roof parts into the respective open or closed position is possible even under cramped space conditions. While they are being shifted, the two roof parts advantageously are moved synchronously so that, in every phase of the movement, the center of mass is in the vicinity of the connecting joints of the driving assembly and, with that, punctual overloading is avoided even in the case of an overall construction, which is enlarged for a 4-seater vehicle.

Further details and advantages of the invention arise out of the following description and the drawings which illustrate an example of the inventive convertible vehicle.

IN THE DRAWINGS

FIG. 1 shows a side view of a convertible vehicle with a roof shell with two roof parts extending between a rear roof region and a front windshield frame, FIG. 2 shows a plan view of the convertible vehicle of FIG. 1 with, in each case, driving units engaging the roof parts at the edge, in a first embodiment, FIG. 3 shows a side view of the convertible vehicle with the two roof parts in one phase of the opening motion, FIG. 4 shows a side view of the convertible vehicle with the two roof parts in another phase of the opening motion, FIG. 5 shows a partially sectional side view of the convertible vehicle of FIG. 1 with the driving unit in the closed position, FIG. 6 shows an enlarged sectional representation of the driving unit in the region of a swiveling drive, which is in the closed position and located at the rear roof part, FIG. 7 shows a side view of the swiveling drive of FIG. 6 in a swiveling position during the opening or closing process, FIG. 8 shows a side view of the driving unit in the region of a main bearing supporting this driving unit at the body of the vehicle, FIG. 9 is a sectional representation of the main bearing along a line IX—IX in FIG. 8, FIG. 10 is a sectional representation in the region of the pivoting drive along a line X—X of FIG. 11, FIG. 11 is a sectional representation in the region of the driving unit along a line XI—XI of FIG. 5, FIG. 12 is a sectional representation in the region of the pivoting drive along a line XII—XII of FIG. 6, FIG. 13 is a perspective representation of a second embodiment of the driving units with the roof parts in the closed position, FIG. 14 shows a side view of the driving units with a cantilevered supporting assembly in one phase of the movement, FIG. 15 shows a side view of the driving units with a cantilevered supporting assembly in another phase of the movement, FIG. 16 shows a side view of the driving units with a cantilevered supporting assembly in another phase of the movement, FIG. 17 shows a side view of the driving units with a cantilevered supporting assembly in another phase of the movement, and FIG. 18 shows a side view of the supporting assembly with a damping element provided in the region of the lowering drive.

DESCRIPTION OF THE PREFERRED EMBODIMENTS

Figure 1:
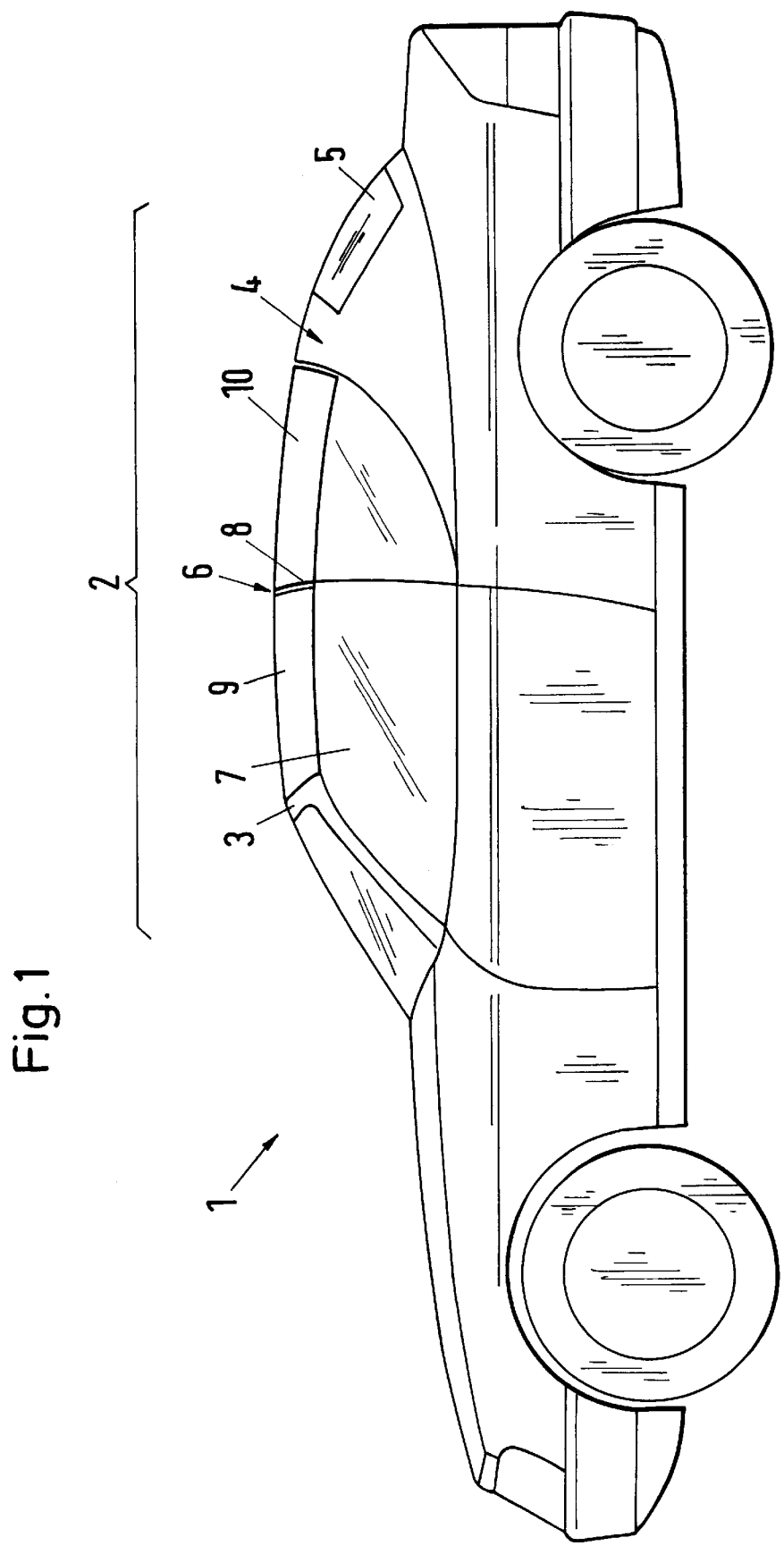

In FIG. 1, a motor vehicle, which is labeled 1 as a whole and the roof 2 of which is constructed in the form of a roof for a convertible vehicle, is shown in side view. The roof 2 has a middle roof shell 6, which extends between a windshield frame 3 and a rear roof region 4 with a rear window 5. The middle roof shell 6 can be shifted into an open position in such a manner, that the interior 7 of the vehicle is opened in the region of the roof contour between the windshield frame 3 and the roof region 4, which is preferably constructed as a sturdy part of the car body.

Figure 2:
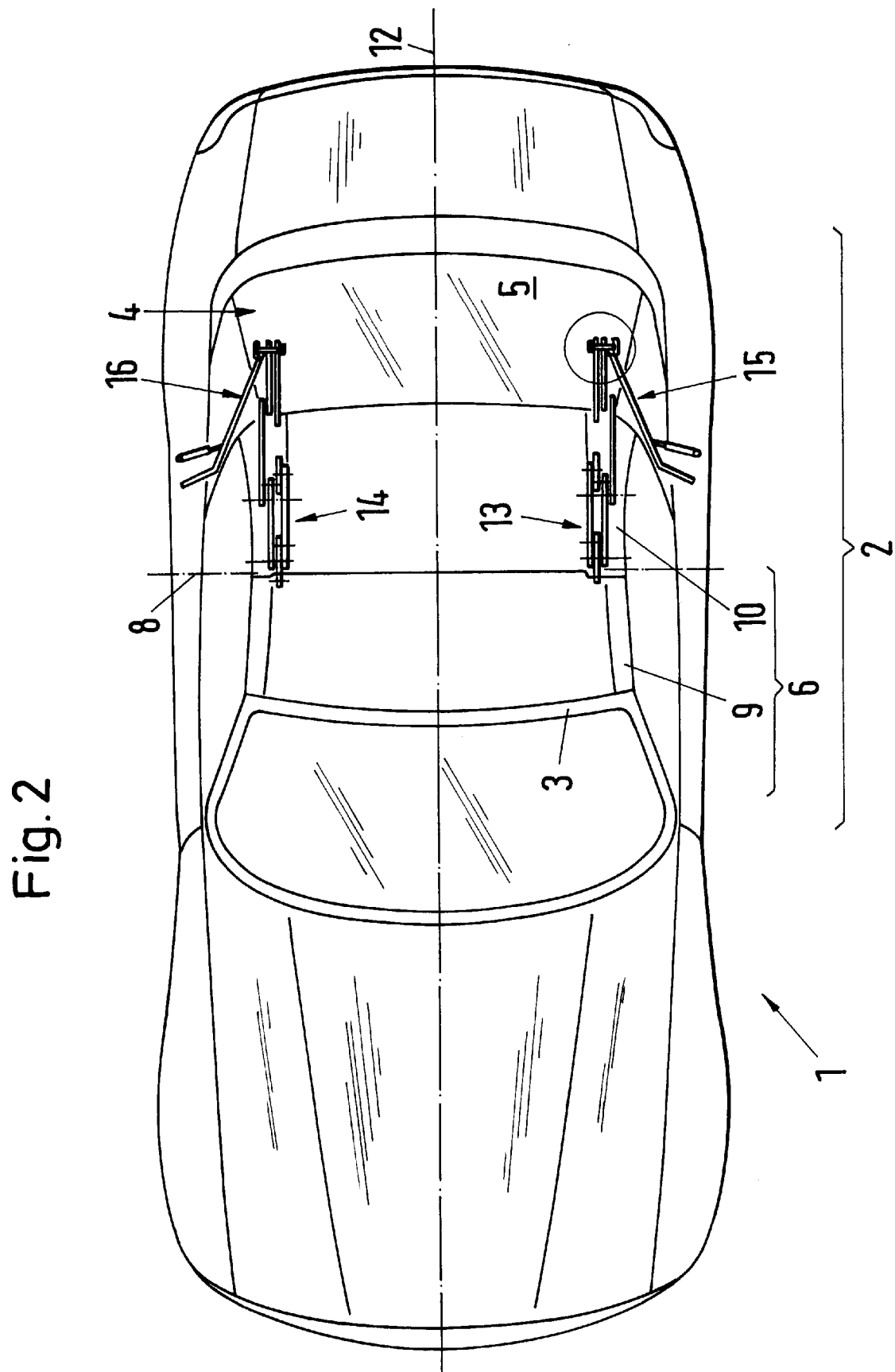

In the inventive construction, the roof shell 6 of the convertible vehicle 1 consists of two roof parts 9 and 10, adjoining one another in the region of a dividing plane 8. These roof parts 9, 10 are connected over joint connections 13, 14, which are disposed symmetrically to longitudinal axis 12 (FIG. 2) of the vehicle and which, in each case, engage the edge and interact, in turn, with driving units 15, 16 respectively engaging the rear roof part 10. In the following part of the specification, the roof construction is explained in each case in side view, it being understood that, because of the symmetrical arrangement, reference has been made to only one of the assemblies at the edge.

Figure 3:
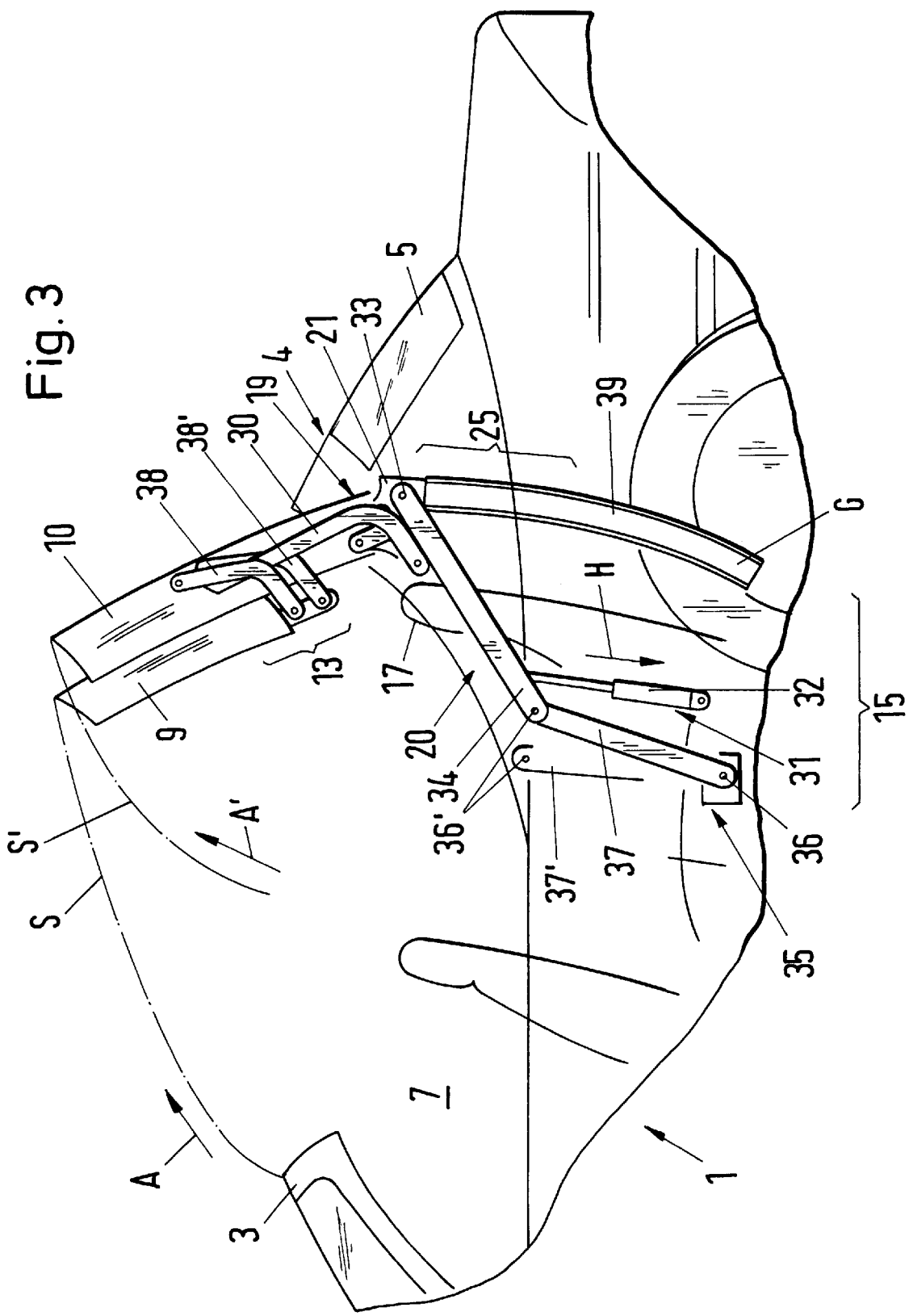
Figure 4:
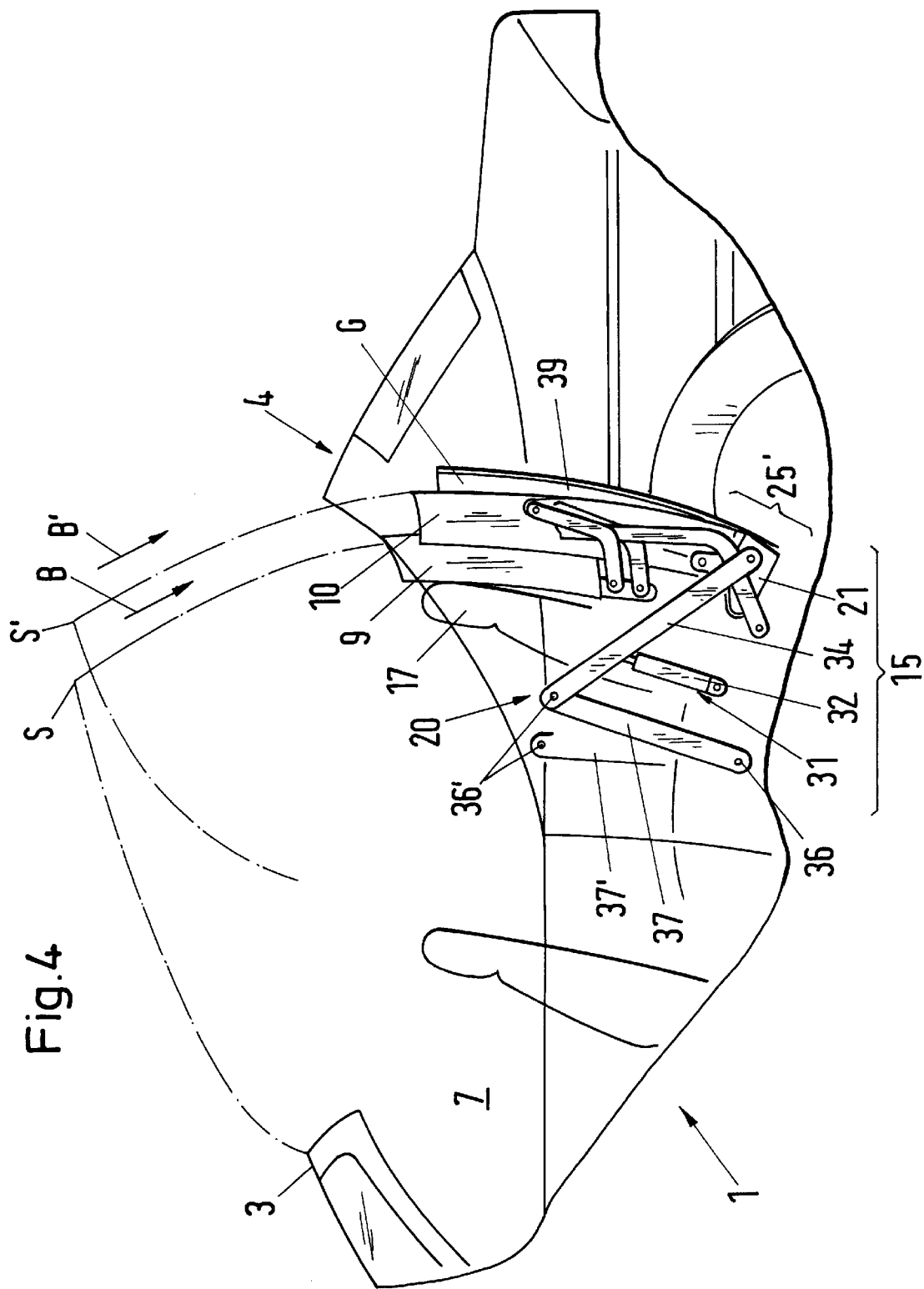

The phases of the motion during the opening process of the two roof parts 9, 10, shown in FIGS. 3 and 4, illustrate the pivoting motion counter to the driving direction as far as into an approximately vertical position (arrow A, A'). After that, the two roof parts 9, 10 are lowered in the direction of a motion, illustrated with the arrows B, B', into a packed position behind the rear seats 17 in the interior 7 of the vehicle (FIG. 4).

The opening motion, shown in FIG. 3, takes place largely synchronously for the two roof parts 9, 10 over an automatic controlling process. On the one hand, the front roof part 9 is detached from the windshield frame 3 and, on the other, the rear roof part 8 is detached. The two roof parts are then swung up into an approximately vertical position, in which they are parallel to one another one behind the other, after which they are lowered simultaneously into the packed position. It is also conceivable to swing the two roof parts 9, 10 simultaneously in this position into the vertical position while their connected position in the dividing plane 8 is retained and, after that, by an altered motion control, to attain a time-offset positioning into the one behind the other position and the packed position.

Figure 5:
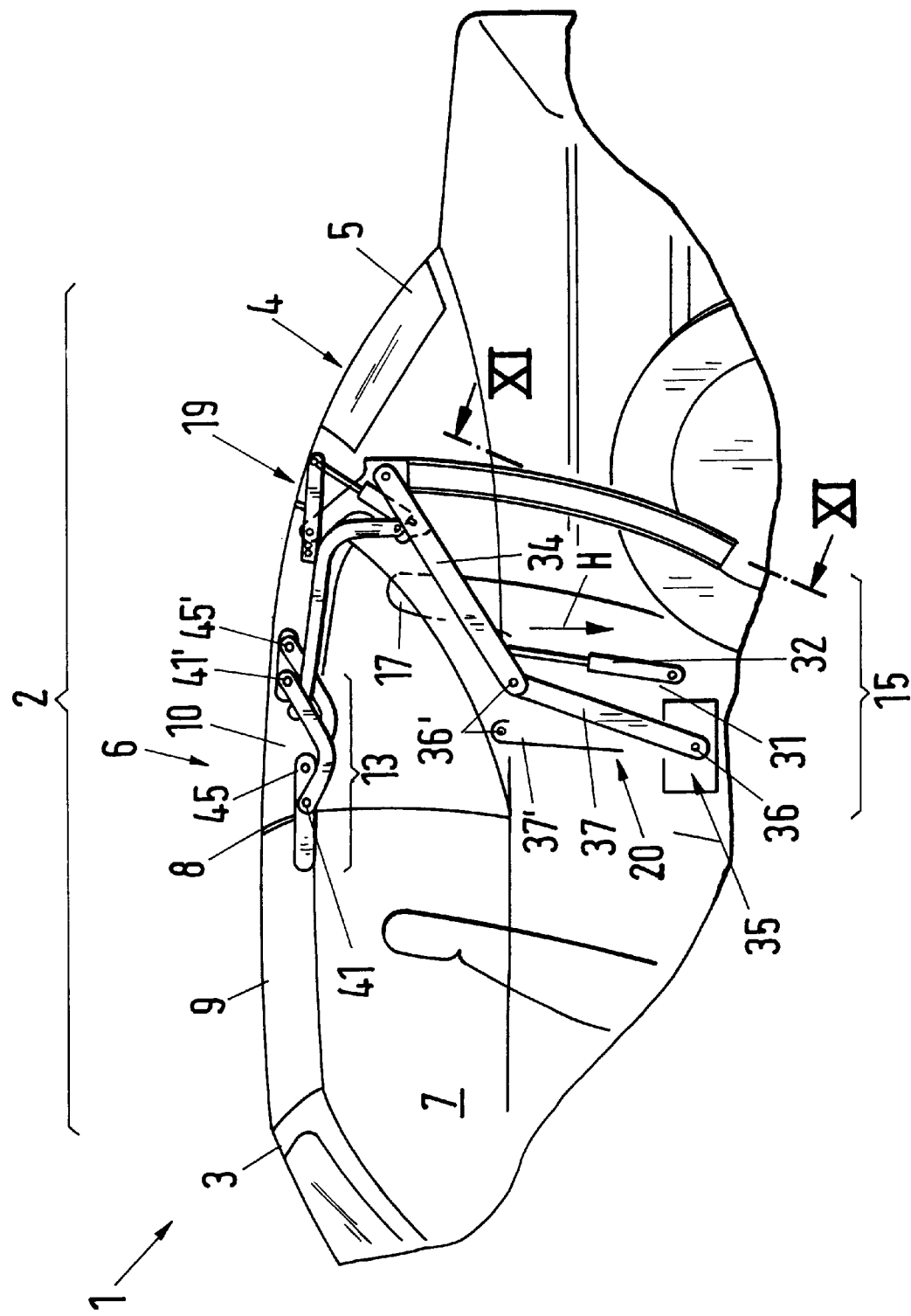
Figure 6:
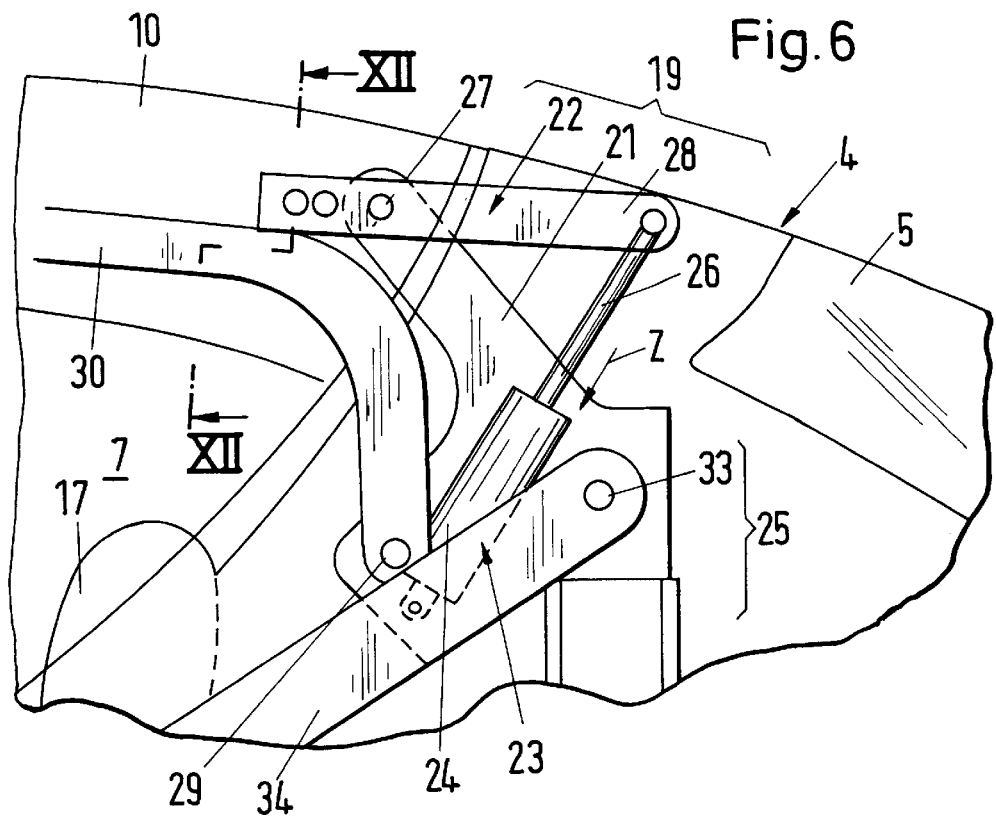
Figure 7:
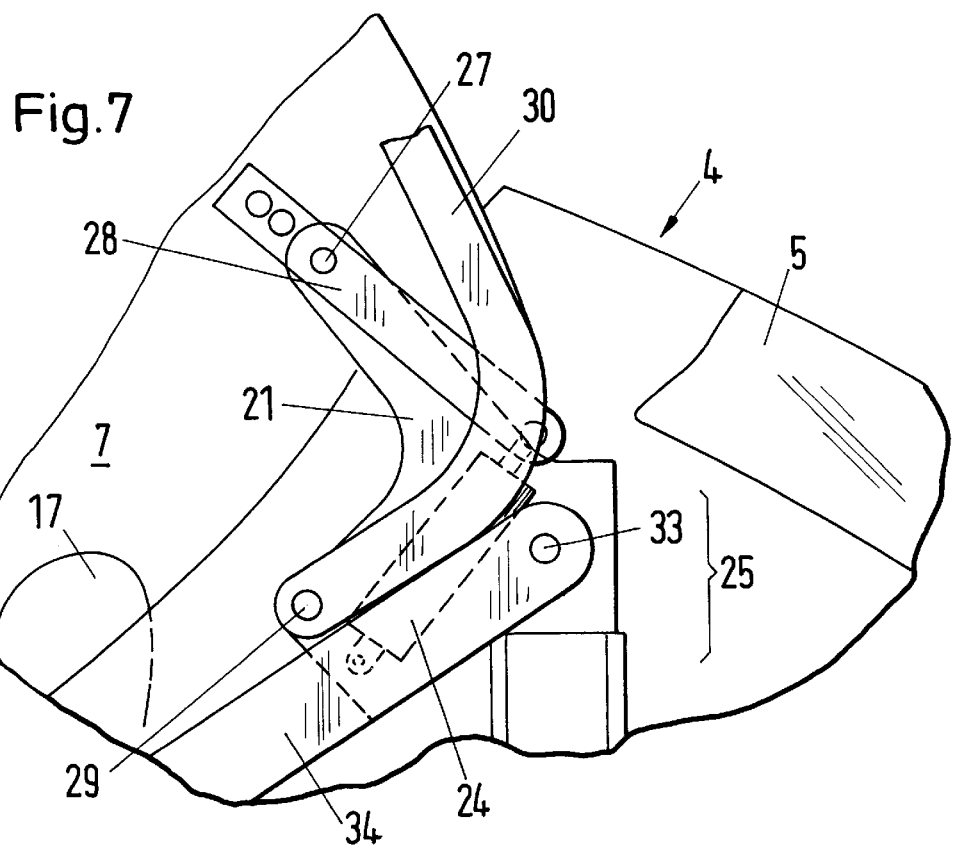

The enlarged, sectional representation of FIG. 5, together with the sectional representations of FIGS. 6 and 7 illustrate the formation of the driving unit 15 for the two roof parts 9, 10, the driving unit 15 being provided with a swiveling drive 19 in the vicinity of the rear roof part 10 and with a lowering drive 20 supported at the car body. During the opening and closing processes, the movement of the two roof parts 9, 10 can be controlled with these two driving mechanism assemblies in such a manner, that the roof parts 9, 10 can be shifted on two swiveling paths S, S' (FIG. 4), which largely leave the interior 7 of the vehicle unaffected and that a safe operation is possible with a high degree of reproducibility. In an appropriate embodiment, the components of the pivoting drive 19 can be shifted during the opening process (FIGS. 3 and 4) in the direction of the lowering drive 20 in such a manner that, in the open position (FIG. 4), the rear roof region 4 is essentially free of additional supportive connecting parts and the components of the convertible roof 2 in the interior 7 of the vehicle behind the rear seats 17 are covered by the side parts of the car body, so that a visually pleasing view of the vehicle 1 is attained.

In FIG. 6, the closing position of the swiveling drive 19, engaging the rear roof part 10, is shown. This pivoting drive 19 is formed with a step bearing 21, at which a driving device 23 in the form of a hydraulic cylinder 24, having an assembly of driving rods 22, which are directed in each case to the rear roof part 10, as well as a guiding assembly 25, supporting the step bearing 21 during the lowering motion (FIG. 4), are provided.

The hydraulic cylinder 24, which is provided as driving device 23, engages with its piston rod 26 a reversing lever 28, which is connected with the rear roof part 10 and forms a hinge 27 at the step bearing 21, in such a manner that, when a tensional movement (arrow Z) is initiated at the hydraulic cylinder 24, a swiveling motion of the rigid roof part 10 about the hinge 27 is initiated (FIG. 7) and this movement is coupled over the joint connection 13 in the form of a forced control system with the front roof part 9.

In an appropriate embodiment, for transferring this swiveling motion at the step bearing 21, an angle strut 30, running from a pivot connecting 29 to the step bearing 21 and to the joint connection 13 of the two roof parts 9, 10, is provided so that the synchronous swiveling motion of the two roof parts 9, 10, shown in FIG. 3, can be effected by means of the previously described swiveling drive 19 in the form of a forced control system. Under the action of the adjusting motion Z at the driving mechanism 23, the rear roof part 10 swivels about the hinge 27 and the linkage components 38 and 38' of the joint connection 13 are moved under the rear roof part 10, acting as a rigid assembly, as well as over the angle strut 30 in such a manner, that the front roof part 9 is moved synchronously with the first section of the movement path S' of the part 10 on the path S and, after traversing these path segments S, S', the two parts, in their approximately vertical position, have the one-behind-the-other position (FIG. 3). Moreover, the angle strut 30 is also formed as a component contributing to the stabilization of this control movement. At the same time, the joint connection 13 with its linkage components 38, 38' and the corresponding hinge points 41, 41' and 45, 45' (FIG. 5) act as a controllable four joint or parallelogrammatic joint, which is disposed in a space-saving manner in the lateral edge region of the roof parts 9, 10 and makes a structurally simple control system possible. The hinge joints 41 and 45 are pivotably connected to the front roof part 9 and the hinge joints 41' and 45 are pivotably connected to the rear roof part 10. The angle strut 30 is pivotably connected to the linkage component 38 at 30'.

Figure 8:
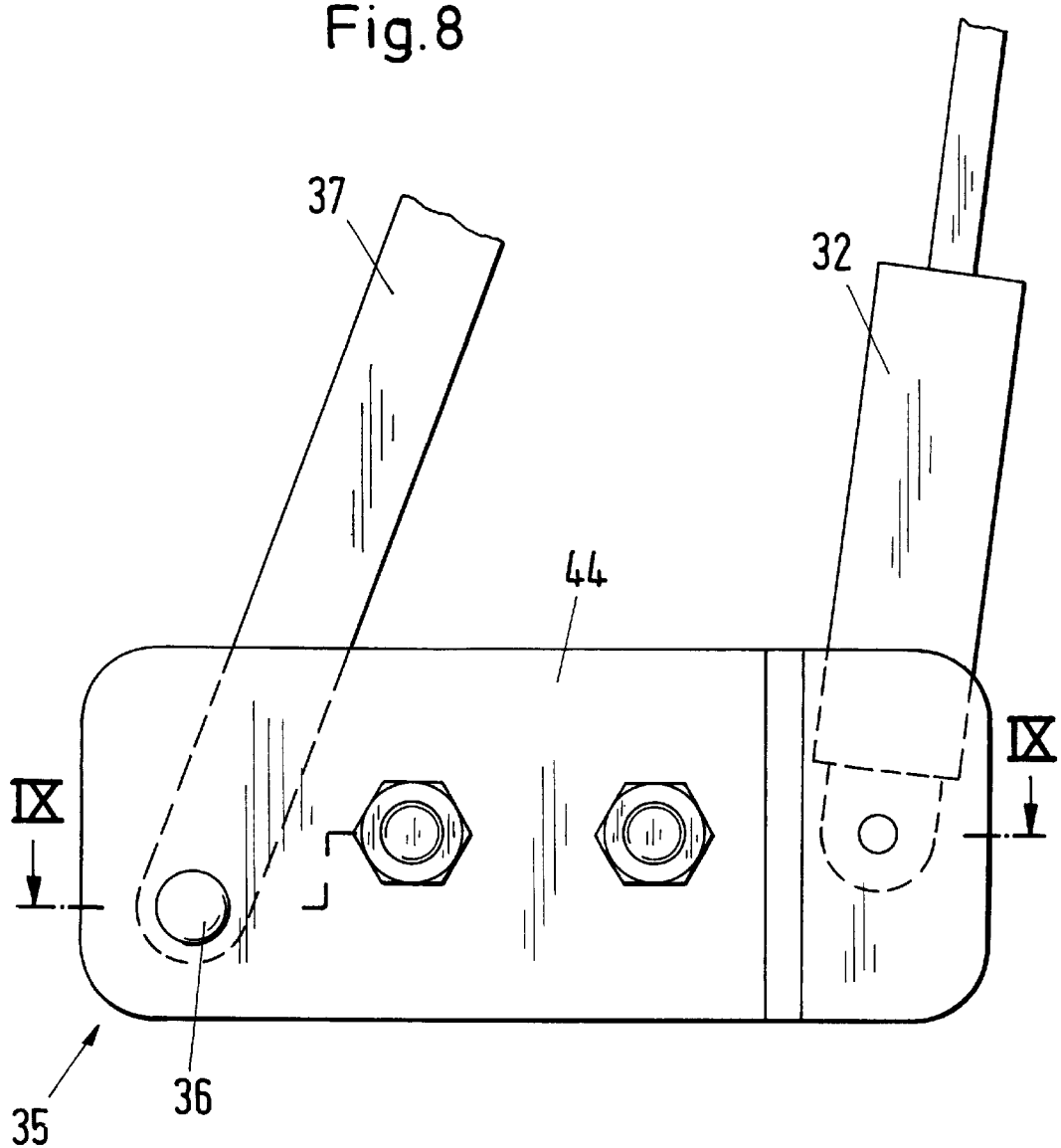

After the above described course of motion in the region of the swiveling drive 19, a hydraulic cylinder 32, which is provided as driving device 31 at the lowering drive 20, can now become active (FIG. 4). On the one hand, this hydraulic cylinder engages the step bearing 21 via a member 34, which forms a common hinge 33 with the guiding assembly 25. In an appropriate embodiment, the piston rod of the hydraulic cylinder 32 is pivotably connected to the member 34 at 34'. On the other, the member 34 is supported by a hinge 36 at a car body main bearing 35 (FIG. 8). In an appropriate embodiment, a swiveling support 37, hinged to the member 34, can additionally be provided between this hinge 36 and the member 34. In the region of a joint 36', the swiveling support can be shifted into a dead center position 37'. With that, the driving unit 15 and the roof parts 9, 10 are reinforced in such a manner in the closed position (FIG. 5), that unintentional movements of components of the roof 2 are reliably avoided.

Figure 10:
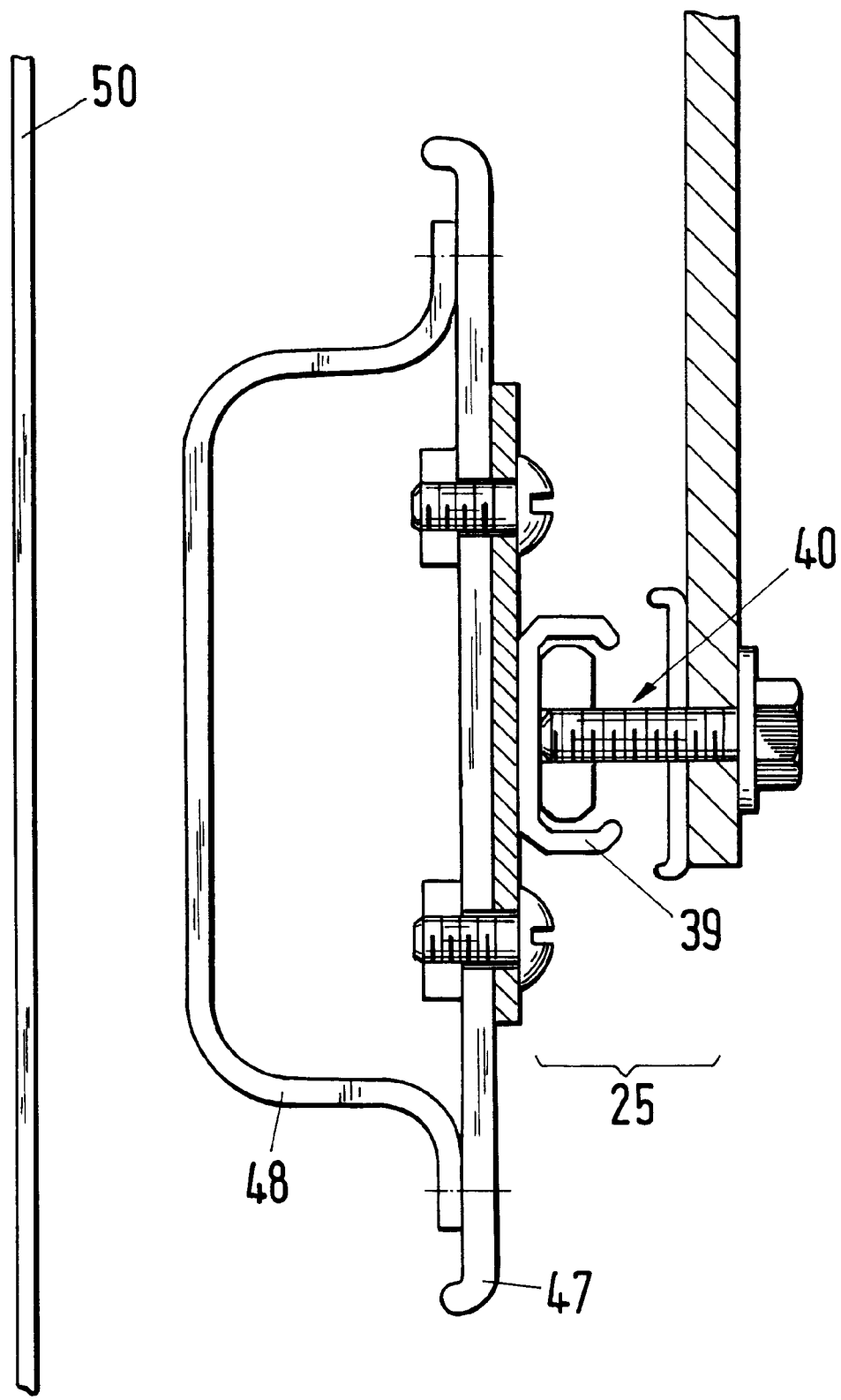

When a tensional movement H is introduced in the region of the hydraulic cylinder 32, the roof parts 9, 10, together with the components in the region of the step bearing 21, are guided by the guiding assembly 25 from the upper vertical position (FIG. 3) into the lowered position (FIG. 4). Moreover, in an appropriate development, the guiding group 25 is provided with a streamlined-section guiding strut 39 (FIGS. 10 and 11), which extends in the rear region of the car body and interacts with an opposing element 40 protruding from the step bearing 21 in the region of the lag hinge 33 in the form of a connecting link guide in such a manner, that the roof assembly and the components of the swiveling drive 19 are forcibly guided jointly on a path of motion G into the lowered position (FIG. 4) and, from this, back into the closed position (FIG. 5).

Figure 9:
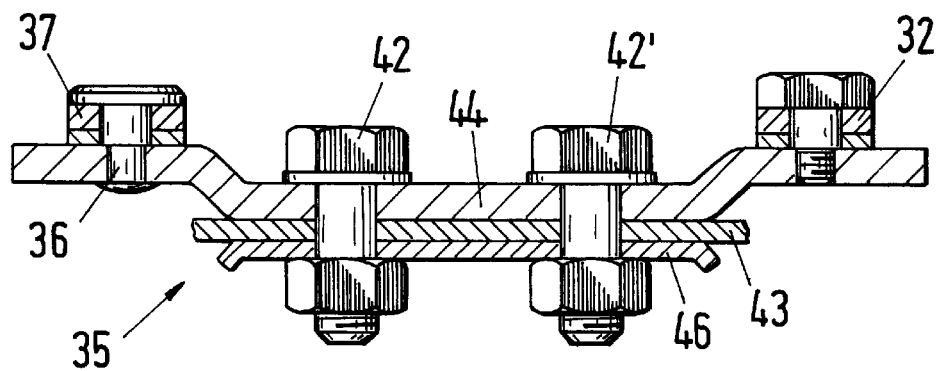

The components in the region of the car-body-side main bearing 35 for supporting the lowering drive 20 or the swiveling support 37 and the hydraulic cylinder 32 are shown in greater detail in FIGS. 8 and 9. In an appropriate embodiment, the respective bolted connections 42, 42' are provided with a reinforcing part 46 for supporting a main bearing plate 44 at a side part 43 of the vehicle body.

Figure 11:
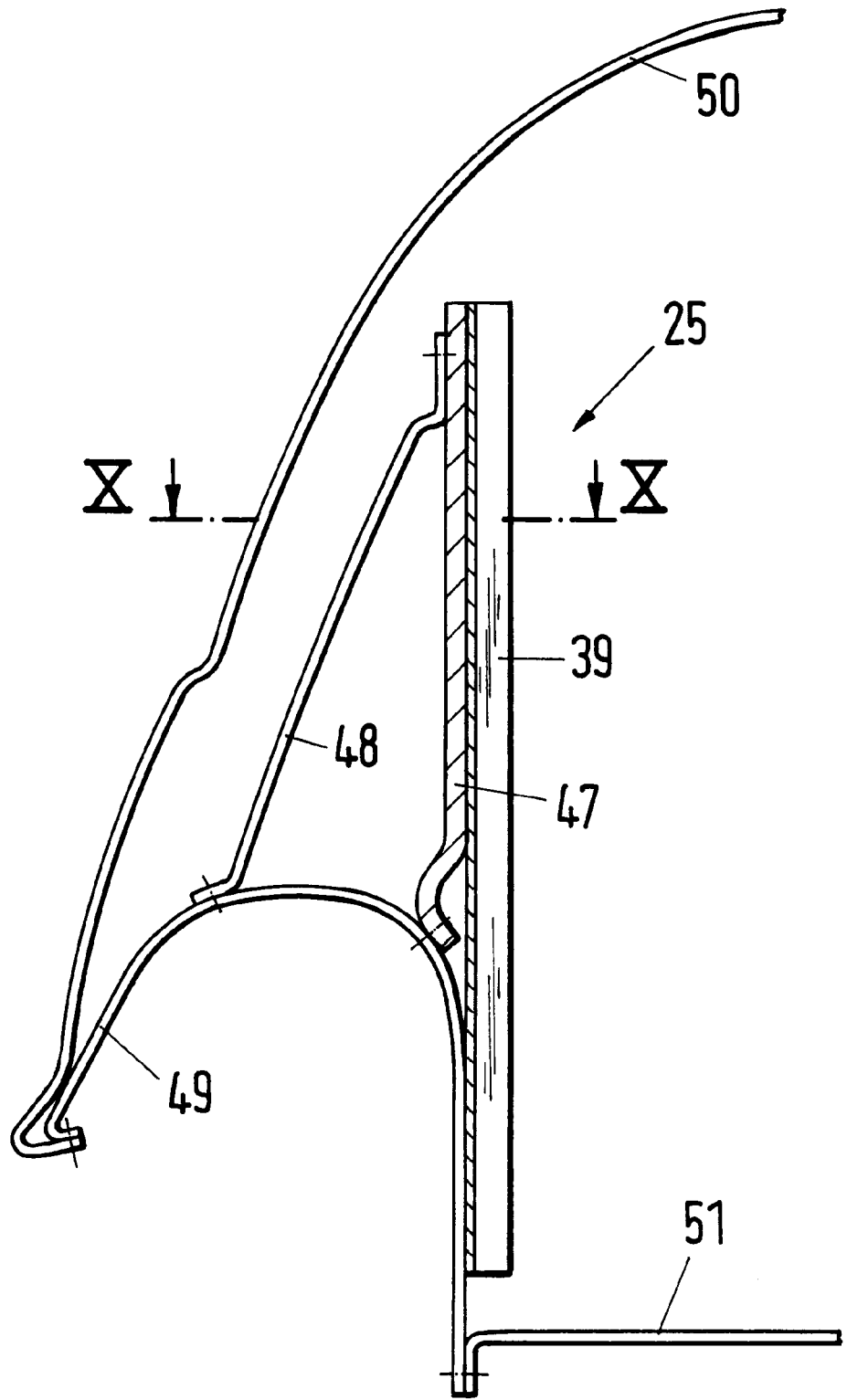

In the sectional representation of FIG. 11, the streamlined-section guiding strut 39 of the guiding assembly 25 with a supporting connector 47 is shown. It is supported over a stabilizing part 48 towards the wheelhousing 49 or towards a lateral part 50 of the car body and a bottom part 51.

Figure 12:
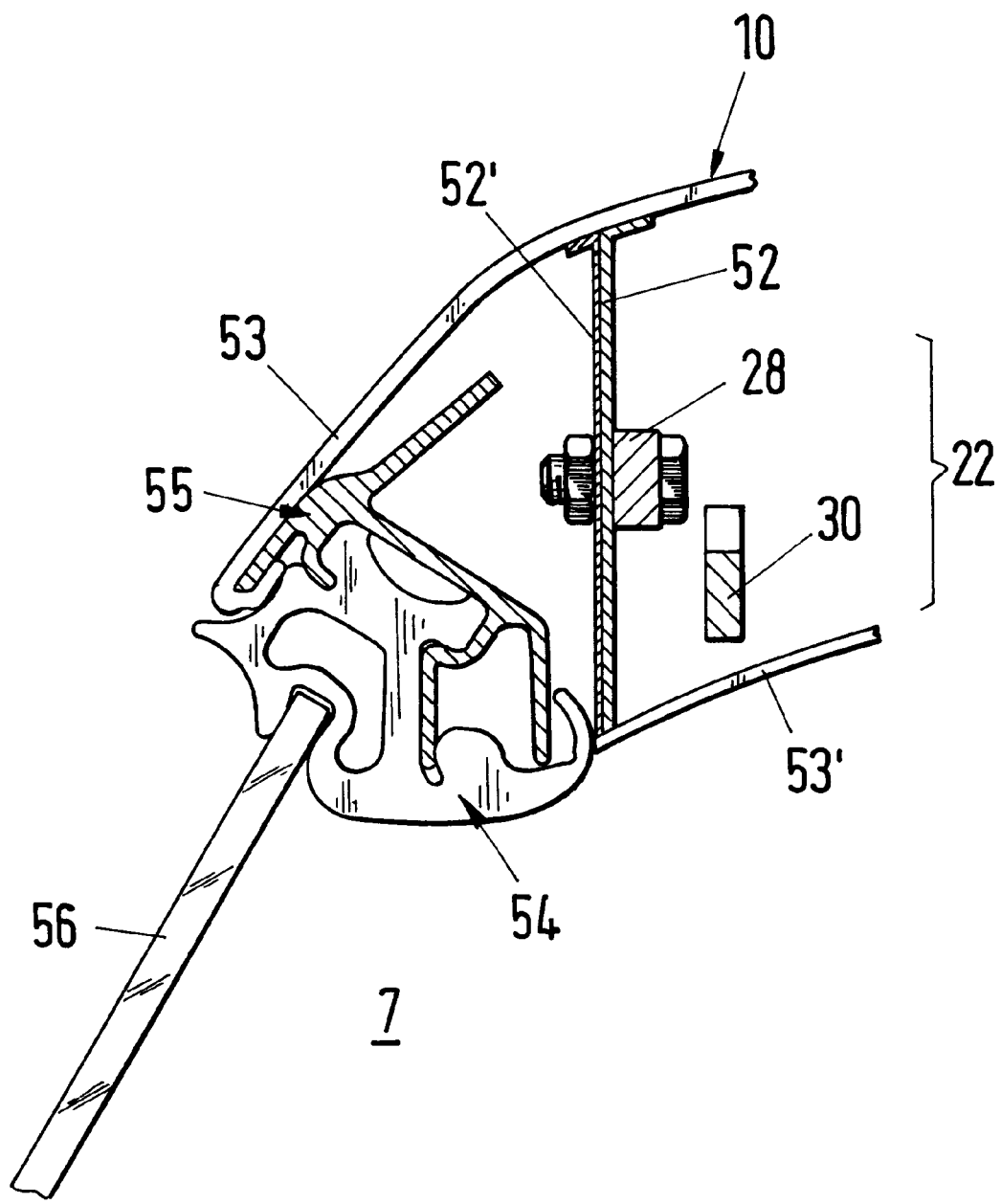

The sectional representation of FIG. 12 illustrates the region connecting the rear roof part 10 and the components of the swiveling drive 19 along the line XII—XII of FIG. 6, the driving linkage 22 with the rear roof part 10 being fixed in the region of the reversing lever 28 to a sheet-metal holder 52 with a reinforcing part 52'. At the same time, an outer skin 53 of the roof part 10, which is above an inner lining 53', overlaps a roof frame seal 54, which is in the region of a side window 56 and fixed by means of a profile connecting part 55.

Figure 13:
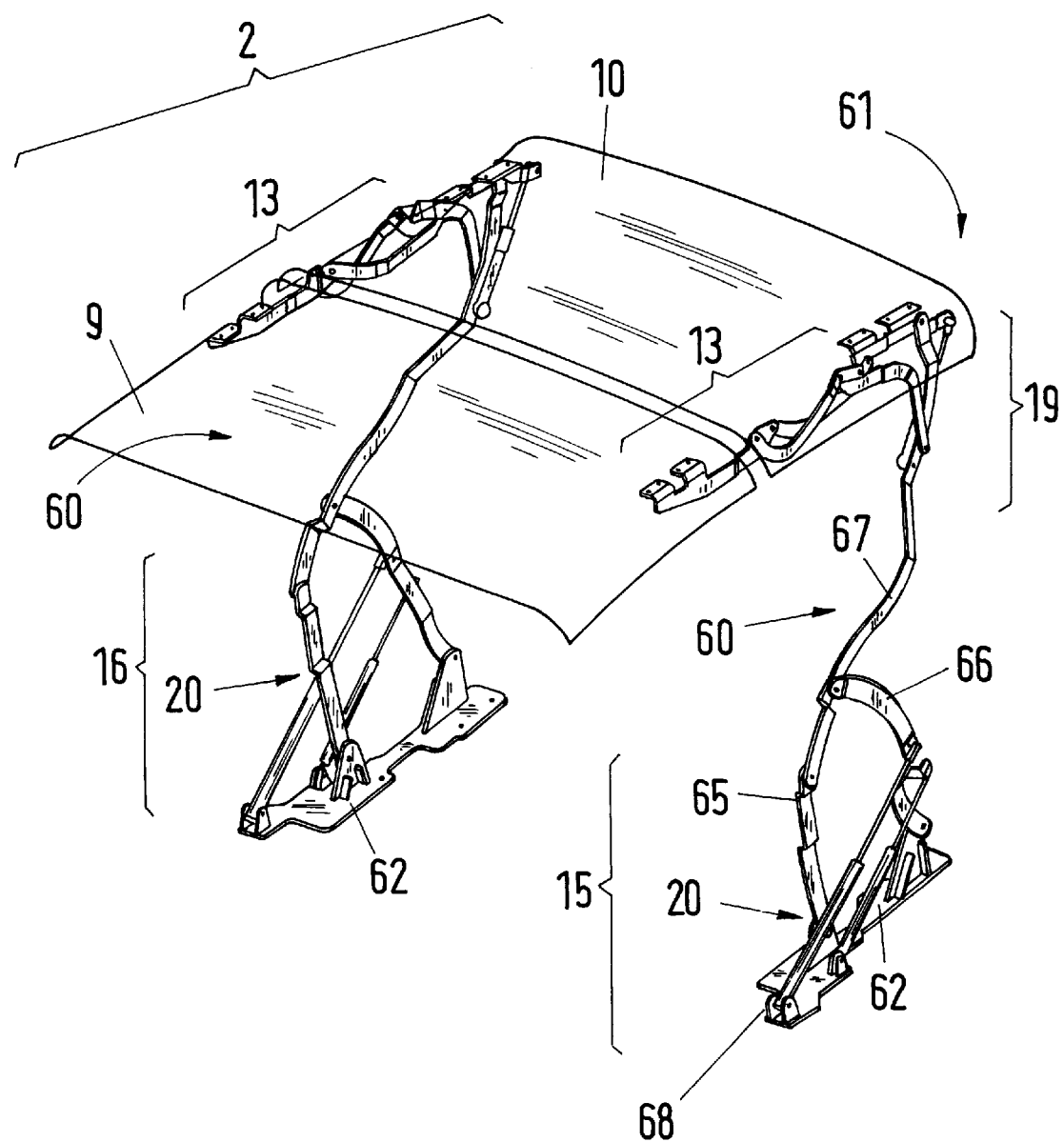
Figure 14:
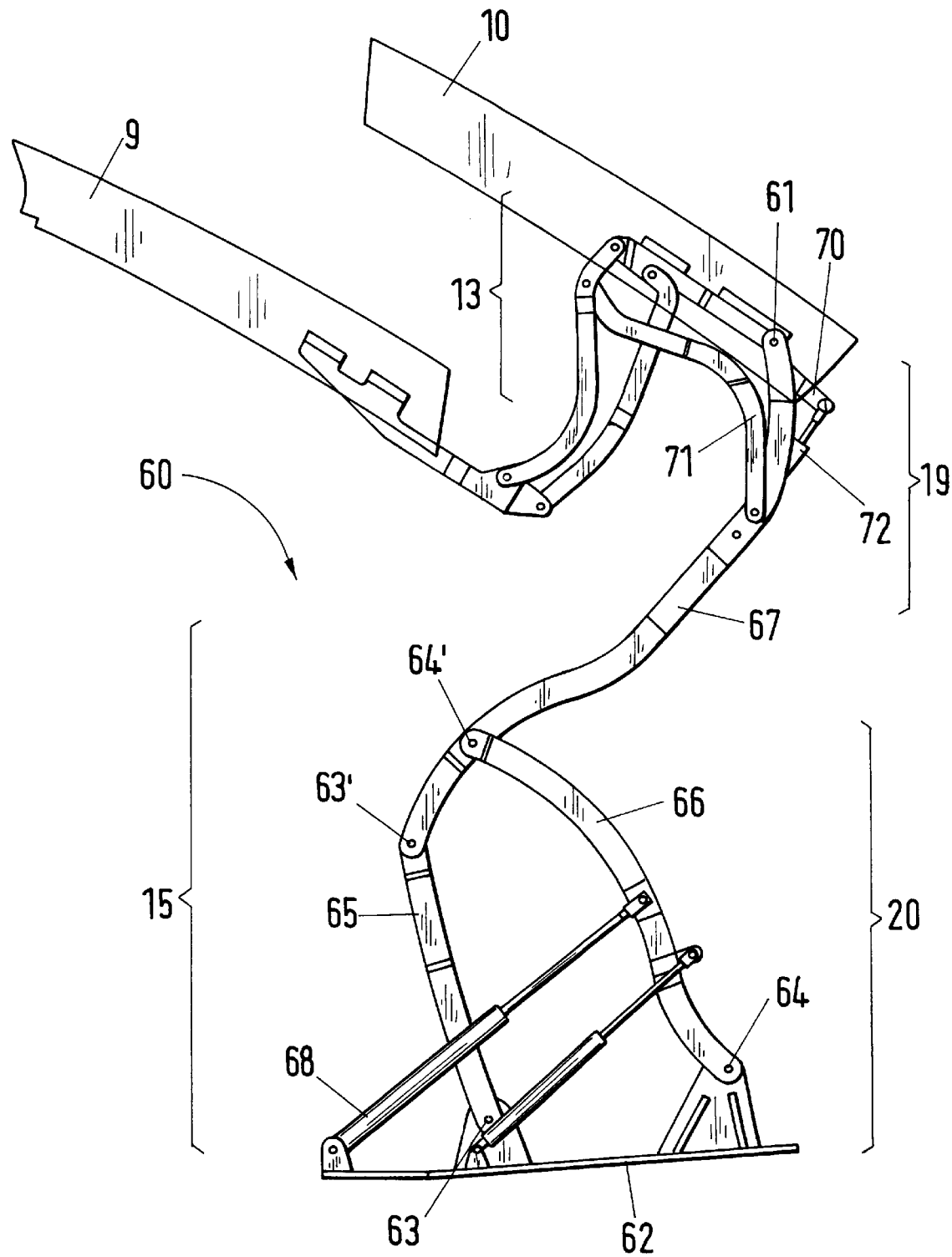

In FIG. 13, a perspective view of a second embodiment of the inventive roof 2 is shown. In the region of the drive units 15 and 16, disposed symmetrically to the longitudinal axis 12 of the vehicle, this second embodiment of the inventive roof 2 is provided with a supporting assembly 60 (FIG. 14), which in each case is cantilevered and interacts with the joint connection 13 of the roof parts 9, 10. In the region of the swiveling drive 19 at the roof, the supporting assembly 60 engages the rear roof part 10 over a main bearing 61 and, at the other end, the lowering drive 20 is provided, the direction of action of which can be reversed for the closing motion of the roof 2.

The supporting assembly 60 is provided with a holding part 62, which is fixed to the car body and at which a guiding link 65 and a driving link 66 are supported by means of respective joints 63, 64. At the other end, the guiding link 65 and the driving link 66 are hinged to a supporting link 67 (joints 63', 64'), which is hinged to the roof parts 9 and 10 in the region of the swiveling drive 19 and has a longitudinal contour with arched formations, which is optimized for a space-saving swiveling motion and stable absorption of loads.

Figure 18:
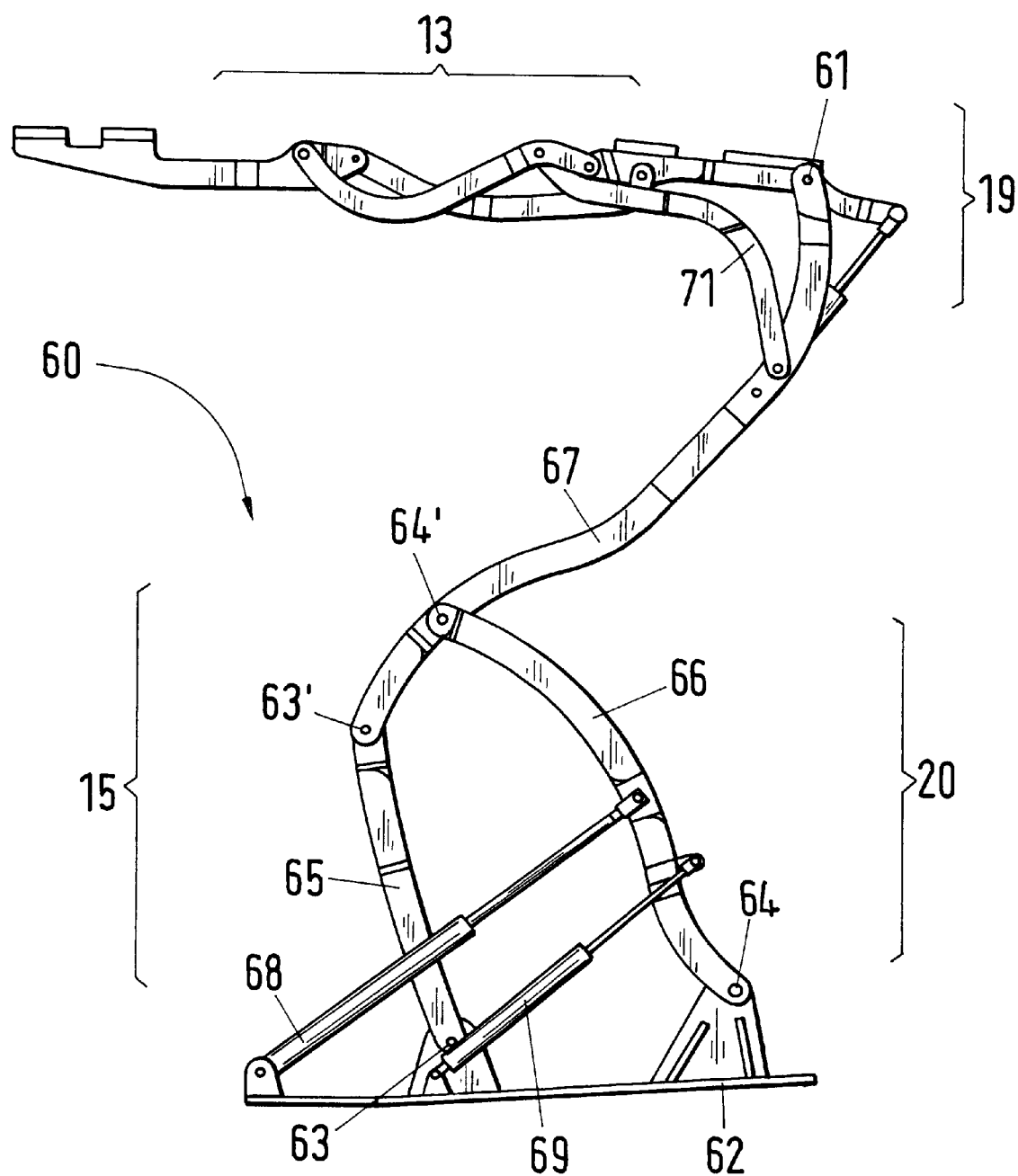

In the region of the holding part 62, fixed to the car body, a hydraulic cylinder 68, which engages the S-shaped, curved driving link 66 essentially centrally, is provided as driving device. A damping element, in the form of a gas pressure spring 69, with which shock absorption of the weight forces, acting when the roof assembly is moved, is achieved, may be provided in the region of the hydraulic cylinder 68. It is shown in FIG. 18 and extends essentially parallel to the driving cylinder 68.

Figure 15:
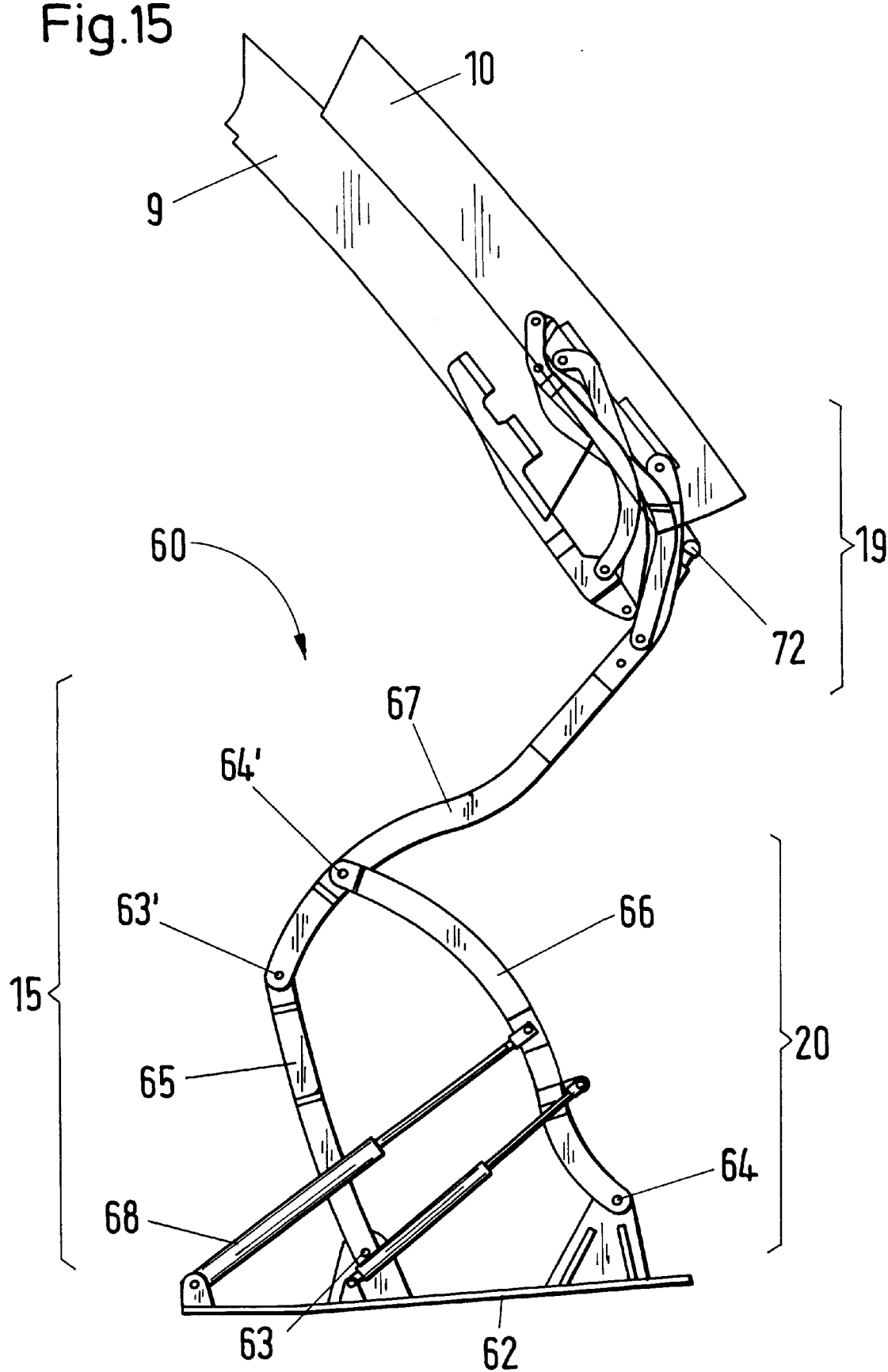
Figure 16:
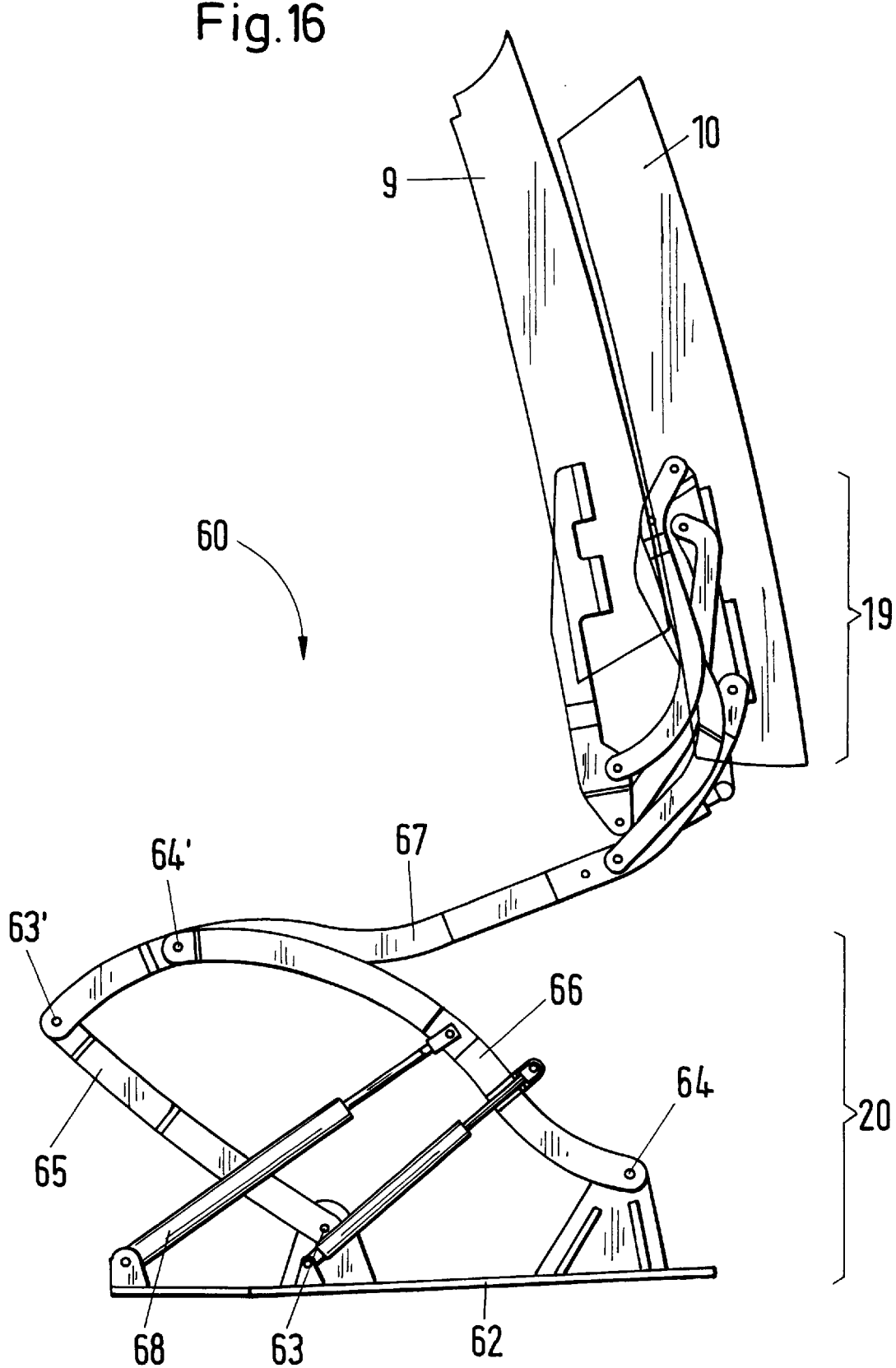
Figure 17:
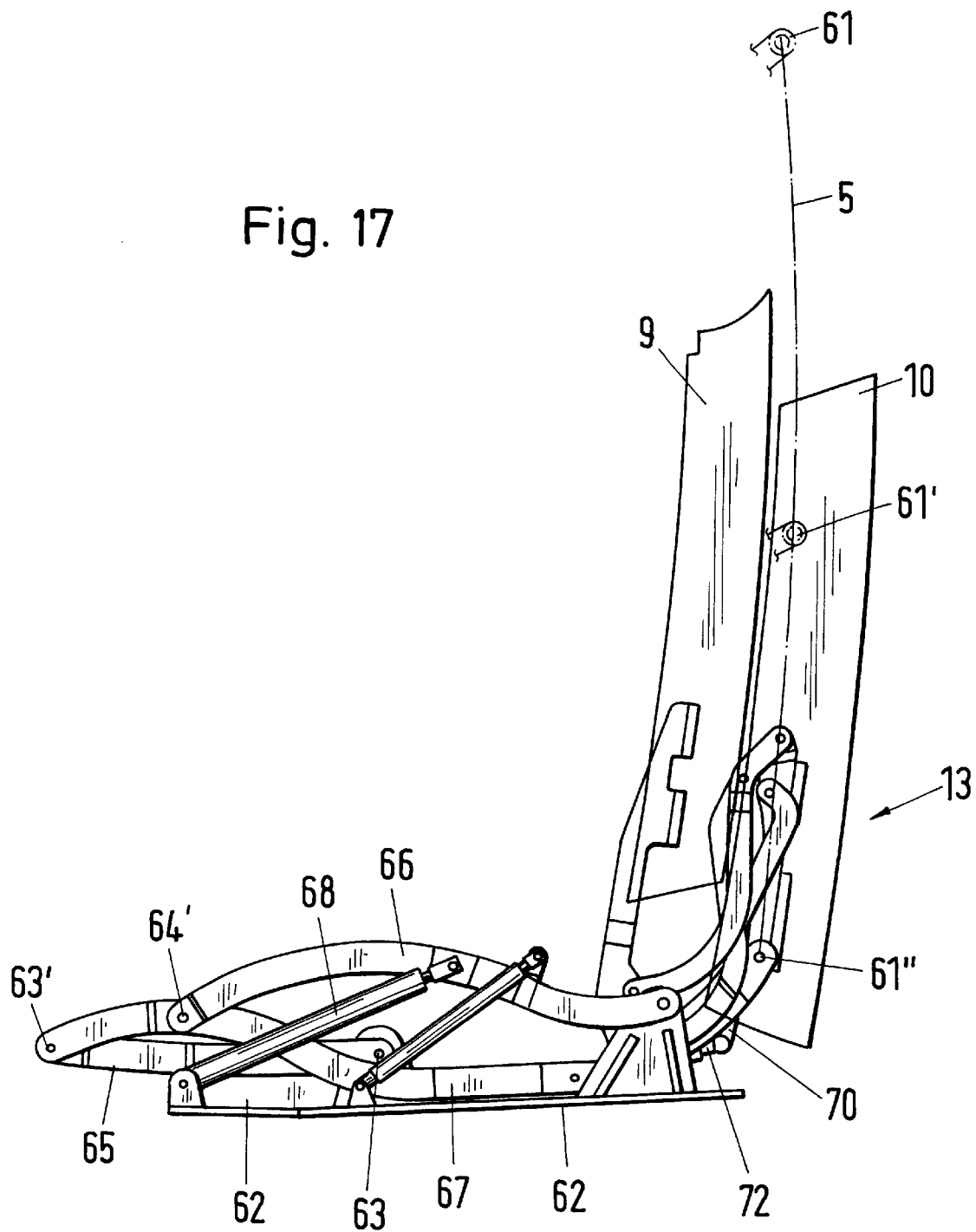

The side views of FIGS. 14 to 17 illustrate that the swiveling drive 19 interacts in the region of the main drag bearing 61 over a connecting lever 70 and a push-pull rod 71, hinged at the supporting link 67, with the rear roof part 10 and the front roof part 9. During the opening motion (or during the closing motion in the reverse sequence of motions), the roof parts 9 and 10 are moved by means of the joint connection 13 in a first phase of the motion (similar to FIG. 3) over the swiveling drive 19 or its hydraulic cylinder 72 and over the push-pull rod 71 into the packed position (FIG. 15). After that, the whole of the roof construction can be swiveled under the action of the lowering drive 20 into the lower storage position (FIGS. 16 and 17). The respective positions of the main bearing 61, 61', 61" are shown in FIG. 17, so that it becomes clear that the path of motion of the roof construction is an S-shaped swing-in curve. This swing-in curve will be traversed in accordance with the action of the supporting assembly 60 and its components acting as control rods. With little expenditure for construction, this S-shaped path of motion can be adapted to the movement spaces in the bodies of different vehicles.

In a further embodiment of the construction of the driving mechanism, it is conceivable to couple the cantilevered supporting assembly 60 at least regionally on its S-shaped path of motion with a guiding element (not shown), so that disadvantageous transverse motions of the roof construction during the opening and closing processes are avoided.

What we claim is:

1. A roof assembly for a convertible vehicle having a windshield comprising a roof shell moveable between open and closed positions, said roof shell having a front part and a rear part, said front part being connected to said windshield when the roof shell is in its closed position, a joint connection connecting said front and rear parts and positioning said front and rear parts contiguous to one another when the roof shell is in its closed position, and drive means engaging said rear roof part to move said front and rear roof parts into an intermediate position in which said front roof part is disconnected and spaced from said windshield and to subsequently lower the front and rear roof parts to thereby define the open position of the roof shell.

2. A roof assembly for a convertible vehicle according to claim 1 wherein said front and rear roof parts are in an approximately vertical position when in said intermediate position.

3. A roof assembly for a convertible vehicle according to claim 1 wherein said front and rear roof parts are disposed in an overlapping disposition approximately parallel to one another when in said intermediate position.

4. A roof assembly for a convertible vehicle according to claim 1 wherein said drive means moves said front and rear roof parts jointly between said closed position and said intermediate position.

5. A roof assembly for a convertible vehicle according to claim 1 wherein said drive means moves said front and rear roof parts simultaneously along different paths between said closed position and said intermediate position.

6. A roof assembly for a convertible vehicle according to claim 1 wherein said drive means moves said front and rear roof parts jointly between said intermediate position and said open position.

7. A roof assembly for a convertible vehicle according to claim 1 wherein said drive means moves said front and rear roof parts simultaneously substantially along parallel paths between said intermediate position and said closed position.

8. A roof assembly for a convertible vehicle according to claim 1 wherein the vehicle has a rear seat, said drive means lowering the front and rear roof parts into the vehicle behind said rear seat to define the open position of the roof shell.

9. A roof assembly for a convertible vehicle according to claim 1 in which the vehicle includes a vehicle body, said drive means comprising a first drive unit connected to said rear roof part and a second drive unit pivotally connected to the vehicle body, said second drive unit mounting said first drive unit.

10. A roof assembly for a convertible vehicle according to claim 9 wherein the second drive unit lowers and raises the front and rear roof parts between said intermediate position and said open position.

11. A roof assembly for a convertible vehicle according to claim 9 wherein said first drive unit includes a step bearing, a power unit mounted on said step bearing, a driving connection between said first drive unit and said rear roof, said second drive unit including a guiding assembly guiding the step bearing as the front and rear roof parts move between said intermediate position and said open position.

12. A roof assembly for a convertible vehicle according to claim 11 wherein said power unit is a fluid operated power unit, said driving connection including a reversing lever fired to said rear roof, said fluid operated power unit being pivotally connected to said reversing lever and pivotally connected to said step bearing.

13. A roof assembly for a convertible vehicle according to claim 12 wherein said reversing level has two end portions and an intermediate portion between said two end portions, one of said end portions being fixed to said rear roof part, the other end portion being pivotally connected to said fluid operated power unit, said intermediate portion being pivotably connected to said step bearing.

14. A roof assembly for a convertible vehicle according to claim 11 wherein said first drive unit includes a strut pivotably connected to said step bearing and pivotably connected to said joint connection between said front and rear roof parts.

15. A roof assembly for a convertible vehicle according to claim 11 further comprising connecting means pivotably connected between said step bearing and said vehicle body.

16. A roof assembly for a convertible vehicle according to claim 15 wherein said connecting means includes two connecting members pivotably connected to one another, one of said connecting members being pivotably connected to said step bearing, the other connecting member being connected to said vehicle body.

17. A roof assembly for a convertible vehicle according to claim 16 wherein said second drive unit includes a fluid operated power unit pivotably mounted on said vehicle body, said fluid operated power unit being pivotably connected to said other connecting member.

18. A roof assembly for a convertible vehicle according to claim 11 wherein said guiding assembly includes a guiding strut mounted on the vehicle body and a guide element mounting on said step bearing and guided on said guiding strut as said front and rear roof parts move between said intermediate and open positions.

19. A roof assembly for a convertible vehicle according to claim 18 where said guiding strut has a arch-shaped configuration effecting an arch-shaped movement of said guiding element when said front and rear roof parts move between said intermediate and open positions.

20. A roof assembly for a convertible vehicle according to claim 1 in which the vehicle includes a vehicle body, said drive means including a cantilevered support assembly pivotably connected to said rear roof part and providing a cantilever support for said front and rear roof parts.

21. A roof assembly for a convertible vehicle according to claim 20 wherein said cantilever support assembly includes a support link pivotably connected to said rear roof part, a guide link pivotably connected to said vehicle body and to said support link, and a drive link pivotably connected to said vehicle body and to said support link.

22. A roof assembly for a convertible vehicle according to claim 21 further including a fluid operated power unit disposed between said drive link and said vehicle body.

23. A roof assembly for a convertible vehicle according to claim 21 further including a damping unit disposed between said drive link and said vehicle body to absorb the weight of the roof assembly.

24. A roof assembly for a convertible vehicle according to claim 21 including a push-pull member pivotably connected to said support link and to said joint connection between said front and rear roof parts, a connecting part fixed to said rear roof part, and a power unit pivotably connected to said connecting part and to said support link and operable to move said front and rear parts between said closed and intermediate positions.

25. A roof assembly for a convertible vehicle according to claim 24 wherein said cantilever support assembly moves between a first position and a second position as said front and rear roof parts moves between said intermediate position and said open position respectively, and guide means on the vehicle body for guiding said cantilever support assembly at least partially as said cantilever support assembly moves between said first and second positions.

26. A roof assembly for a convertible vehicle having a windshield comprising a roof shell moveable between open and closed positions, said roof shell having a front part and a rear part, said front part being connected to said windshield when the roof shell is in its closed position, a pivotal connection pivotably connecting said front and rear parts and positioning said front and rear parts contiguous to one another when the roof shell is in its closed position, and a drive assembly engaging said rear roof part to pivot said front and rear roof parts into an intermediate position in which said front and rear roof parts are in a substantially non-contiguous and side-by-side relationship and to subsequently lower the front and rear roof parts into the vehicle to thereby define the open position of the roof shell.

27. A roof assembly for a convertible vehicle according to claim 26 wherein said pivotal connection between said front and rear roof parts is a parallelogrammatic pivotal connection including two links each pivotably connected to said front and rear roof parts.

* * * * *